(12) United States Patent
Baek

(10) Patent No.: US 8,343,653 B2
(45) Date of Patent: Jan. 1, 2013

(54) SECONDARY BATTERY

(75) Inventor: Woon-Seong Baek, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 202 days.

(21) Appl. No.: 12/762,154

(22) Filed: Apr. 16, 2010

(65) Prior Publication Data

US 2011/0129725 A1    Jun. 2, 2011

Related U.S. Application Data

(60) Provisional application No. 61/265,223, filed on Nov. 30, 2009.

(51) Int. Cl.
*H01M 2/08* (2006.01)

(52) U.S. Cl. ......................... 429/175; 429/179

(58) Field of Classification Search .................. 429/100, 429/175, 176, 179
See application file for complete search history.

(56) References Cited

U.S. PATENT DOCUMENTS

| 2004/0241541 A1 | 12/2004 | Watanabe et al. |
| 2006/0166089 A1 | 7/2006 | Suzuki et al. |

FOREIGN PATENT DOCUMENTS

| DE | 103 50 694 A1 | 6/2004 |
| JP | 2005-108485 | 4/2005 |
| JP | 2005-228573 | 8/2005 |
| JP | 2006-202629 | 8/2006 |
| KR | 20-0396721 | 9/2005 |
| KR | 100646538 | 11/2006 |
| KR | 1020090026697 | 3/2009 |
| KR | 1020090031158 | 3/2009 |
| KR | 1020090050179 | 5/2009 |
| WO | WO 2008/050955 | 5/2008 |

OTHER PUBLICATIONS

IDPL machine translation of JP2006-202629.*
Search report for corresponding EP Application No. 10175378.8-2119, dated Nov. 19, 2010.
Office Action dated Jul. 18, 2011 for corresponding Korean Application No. 10-2010-0046003.
Office Action dated Feb. 27, 2012 for corresponding KR application No. 10-2010-0046003.

* cited by examiner

*Primary Examiner* — Barbara Gilliam
*Assistant Examiner* — Maria J Laios
(74) *Attorney, Agent, or Firm* — Knobbe, Martens, Olson & Bear, LLP

(57) ABSTRACT

A secondary battery according to the present invention includes a polymer cell in which insulating wing portions are provided on lead tabs and a top case assembled to the polymer cell and having an evasion portion to reduce interference with the insulating wing portions. A secondary battery can reduce interference which occurs between an insulating wing portion having an irregular shape. Further, as a result, it is possible to reduce the variance of the external dimension of an inner pack and achieve a more stable manufacturing process of the inner pack, and increase the reliability and competency of the inner pack to which the polymer cell is applied.

12 Claims, 3 Drawing Sheets

SECONDARY BATTERY

RELATED APPLICATIONS

This application claims priority to and the benefit of U.S. Provisional Application No. 61/265,223 filed Nov. 30, 2009, the entire content of which is incorporated herein by reference.

BACKGROUND

1. Field of the Invention

An embodiment relates to a secondary battery and, more particularly, to a secondary battery capable of achieving more stable assembly of a polymer cell and a top case having an exterior shape that is irregular due to problems in a manufacturing process.

2. Discussion of Related Art

In general, a secondary battery is a battery in which conversion between chemical energy and electrical energy is reversible, such that charging and discharging can repetitively be performed. These batteries are increasingly used as a driving power supply for mobile and portable IT apparatuses as their weight decreases and their functionality increases.

The secondary battery includes a nickel-cadmium battery, a nickel-hydrogen battery, a nickel-zinc battery, a lithium secondary battery, etc. Among them, since the lithium secondary battery is rechargeable and can have a small size, be miniaturized, have a high capacity, high operating voltage and high energy density per unit weight, the lithium secondary battery is widely used in an advanced electronic apparatus fields. These batteries include a lithium-ion battery, a lithium-ion polymer battery a lithium polymer battery, etc.

One example is a polymer battery where a polymer cell is sealed in a case with an anode terminal and a cathode terminal from an electrode assembly exposed to the outside of the case. In addition, additional insulating tape is attached to outer surfaces of the anode and cathode terminals which are in contact with a sealed part when the anode and cathode terminals are exposed to the outside. This is also generally referred to as an insulating wing portion or an insulating terrace portion. However, the insulating wing portion or the insulating terrace portion that is formed by the insulating tape is frequently contracted and transformed due to heat when the polymer cell is sealed. In addition, when the insulating wing portion is deteriorated, size stability is deteriorated and it is difficult to provide a battery pack satisfying an overall outline dimensions of the cell. In particular, interference occurs when the cell is assembled with the top case due to the insulating wing portion which is deteriorated due to the heat, such that the overall size stability and reliability of the battery pack are reduced.

SUMMARY OF THE INVENTION

An embodiment provides a secondary battery capable of reducing interference which occurs between an insulating wing portion of a polymer cell and a top case assembled therewith by forming an evasion unit in the top case thereby achieving the stabilization of an inner pack during the manufacturing process while not changing the outer dimensions of the inner pack.

In order to achieve the above-mentioned object, according to an aspect of the present invention, a secondary battery includes a polymer cell in which insulating wing portions are provided in lead tabs and a top case assembled to the polymer cell and having an evasion portion to evade interference with the insulating wing portions.

Further, in the top case, the evasion portion is provided at each portion which the insulating wing portions contact. Herein, the evasion portion may have a groove shape.

In addition, in the top case, a first support rib coupled with the top of the polymer cell is provided.

Moreover, in the top case, a second support rib protecting the lead tabs from the outside is provided in the evasion portion. Herein, the second support rib has a width smaller than that of the evasion portion.

Further, the second support rib may extend up to a position where a lead tab exposed by the evasion portion is formed.

According to an embodiment of the present invention, a secondary battery can reduce interference which occurs when a polymer cell and a top case are assembled by forming an insulating wing portion in the polymer cell having an irregular exterior shape. As a result, it is possible to generally maintain the external dimension of an inner pack and achieve the stabilization of a manufacturing process of the inner pack.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF THE INVENTION

Hereinafter, embodiments of the present invention will be described in detail with reference to the accompanying drawings. Further, the embodiment of the present invention provides to more completely describe the present invention to those skilled in the art and the embodiment described below may be modified in various other forms and the scope of the present invention is not limited to the embodiment described below.

Figure 1:
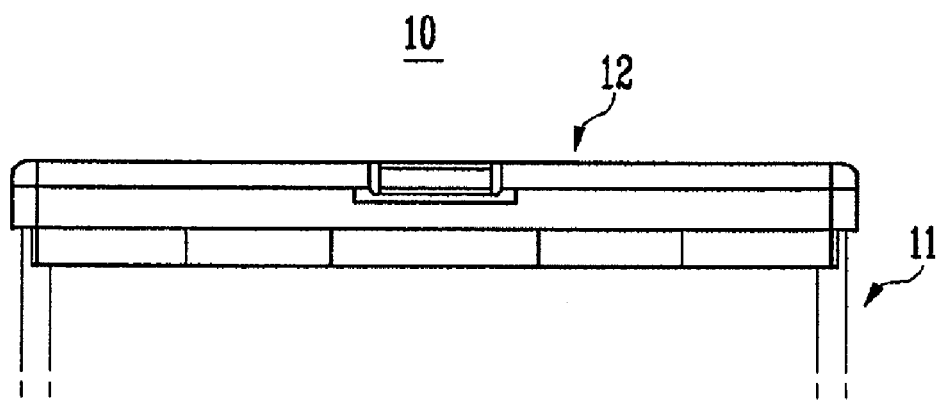
FIG. 1 is a front view showing a top case of a general secondary battery.
Figure 2:
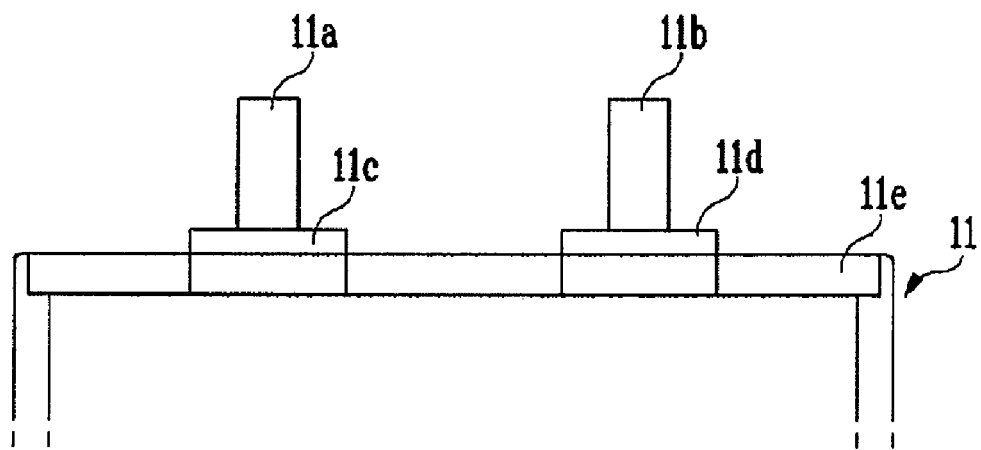
FIG. 2 is a front view showing a part of a polymer cell of a secondary battery.

FIG. 1 is a front view showing a top case of a general secondary battery and FIG. 2 is a front view showing, particularly, a part of a polymer cell of a secondary battery. Referring to FIG. 1, the secondary battery 10 includes a polymer cell 11 housing an electrode assembly (not shown) therein and a top case 12 assembled on the top of the polymer cell 11.

Referring to FIG. 2, the electrode assembly (not shown) is housed in the polymer cell 11, parts of lead tabs 11a and 11b serving as an anode terminal and a cathode terminal is exposed from the electrode assembly to the outside of the polymer cell 11, and a sealing portion 11e where the polymer cell 11 is sealed is provided at portions where the lead tabs 11a and 11b are exposed. At this time, insulating wing portions 11c and 11d for insulation are provided at portions of the lead tabs 11a and 11b which the sealing portion 11e contacts, respectively.

In addition, in the polymer cell 11, safety devices such as a protecting circuit module (PCM) and a secondary protection device are provided in order to prevent an increase of temperature or overcharge and overdischarge, or the like. Any one side of the PCM is connected to a positive pole of the polymer cell 11 and the other side of the PCM is connected to a negative pole of the polymer cell 11 so that the PCM (not shown) is assembled in the top case 12. At this time, the secondary protection device (not shown) may be connected between the PCM and the polymer cell 11 and the secondary protection device may be connected to the positive pole or negative pole depending on characteristics of the polymer cell 11. A subsidiary material is attached thereto to complete an inner pack of the secondary battery.

However, in the polymer cell of the secondary battery thus assembled, the insulating wing portions 11c and 11d comprised by an insulating tape, etc. is also influenced by heat when the sealing portion 11e is compressed by using the heat. When the insulating wing portions 11c and 11d comprising the insulating tape, etc. are influenced by the heat, exterior portions of the insulating wing portion 11c and 11d are contracted or deteriorated, such that the overall size stability of the polymer cell 11 is deteriorated. Consequently, it is difficult to satisfy the overall outline size of the polymer cell 11. In particular, a terrace of a terminal portion of the polymer cell 11, that is, the insulating wing portions 11c and 11d may affect the overall dimensions of the cell 11.

In addition, when the top case 12 is assembled to the polymer cell 11 having the deteriorated insulating wing portions 11c and 11d interference between the insulating wing portion 11c and 11d and the top case may result, thereby damaging the stabilization of the manufacturing process.

Figure 3:
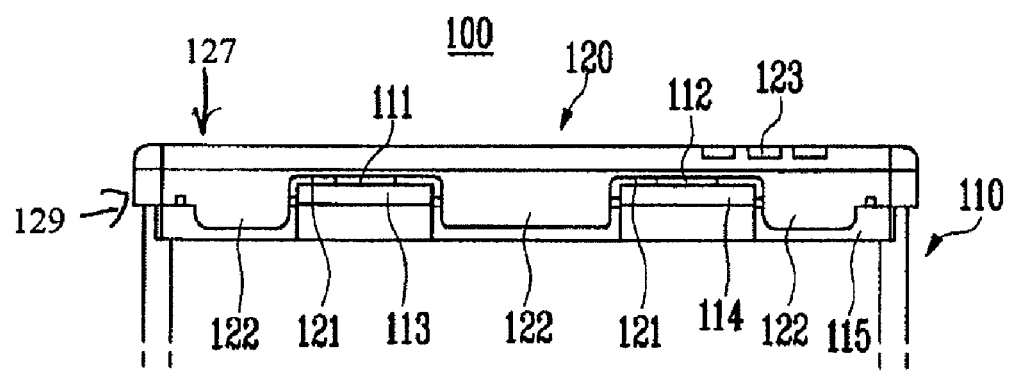
FIG. 3 is a front view showing a secondary battery according to a first embodiment of the present invention.

FIG. 3 is a front view showing a secondary battery according to a first embodiment of the present invention. As shown in the figure, the secondary battery 100 according to the first embodiment of the present invention includes the polymer cell 110 having the insulating wing portions 113 and 114 in the lead tabs 111 and 112 and the top case 120 which is assembled to the top of the polymer cell 110 and where the evasion portion 121 or opening is provided.

In the first embodiment of the present invention, a space as the evasion portion 121 or opening formed in the top case 120 is formed where the insulating wing portions 113 and 114 of the lead tabs 111 and 112 contact each other. Therefore, the insulating wing portions 113 and 114 are positioned in the evasion portion 121 or opening of the top case 120 with less interference. Accordingly, even though the insulating wing portions 113 and 114 are deteriorated by the heat, the evasion portion 121 or opening formed in the top case 120 reduces potential interference and the assembling can be performed. Further, it is possible to improve the robustness of inter-assembling between the cell and the top case 120 by forming one or more first support ribs 122 between the evasion portions 121 or openings as the space in the top case 120.

The electrode assembly (not shown) is housed in the polymer cell 110, the parts of the lead tabs 111 and 112 serving as the anode terminal and the cathode terminal are exposed from the electrode assembly to the outside, and a sealing portion 115 for sealing is provided at portions to which the lead tabs 111 and 112 are exposed. The insulating wing portions 113 and 114 are provided at a portion where the lead tabs 111 and 112 drawn from the polymer cell 110 contact the sealing portion 115 so as to insulate the lead tabs 111 and 112 from an external member of the polymer cell. The insulating wing portions 113 and 114 as terrace portions of the terminal portion at which the lead tabs 111 and 112 of the polymer cell 110 are positioned may comprise an insulation material or insulating tape.

Figure 4:
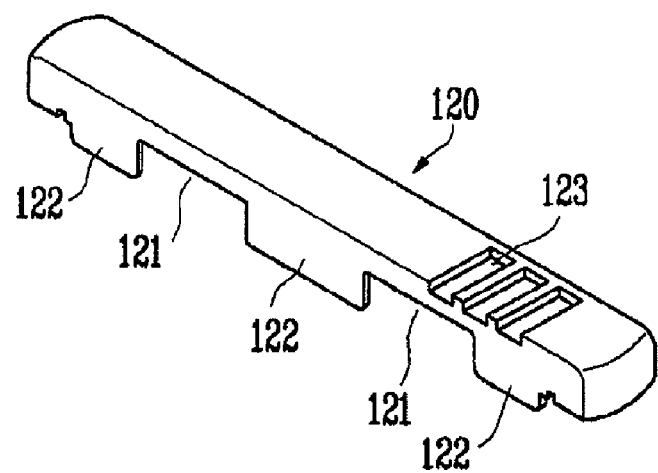
FIG. 4 is a perspective view showing a top case of a secondary battery according to a first embodiment of the present invention.

FIG. 4 is a diagram showing a top case 120 where an evasion portion 121 or opening is formed. The top case 120 includes a first surface 127 and side surfaces 129 that can comprise a front or rear surface. The evasion portion 121 or opening is formed on any one surface of a front surface or a rear surface of the top case 120 at a position which the insulating wing portion contacts and may be formed on both the front surface and the rear surface. Further, one or more first support ribs 122 are provided between the evasion portions 121 or opening or a portion where the evasion portion 121 or opening is not formed. The first support rib extends with a length to more firmly combine and support the polymer cell.

As such, when the top case 120 having the evasion portion 121 or opening and the first support rib 122 is assembled to the polymer 110, the evasion portion 121 or opening of the top case 120 receives both the insulating wing portions 113 and 114.

The safety devices, such as the protecting circuit module (PCM) and the secondary protection device, may be installed in the top case 120 in order to prevent the increase in temperature, overcharge and overdischarge, etc. For this, the PCM (not shown) is assembled to the polymer cell 110 so that the PCM is assembled in the top case 120. Any one of the PCM is connected to the positive pole of the polymer cell 110 and the other one is connected to the negative pole of the polymer cell 110. At this time, the secondary protection device (not shown) may be connected between the PCM and the polymer cell 110 and the secondary protection device may be connected to the positive pole or negative pole depending on characteristics of the polymer cell 110.

The evasion portion 121 or opening may have various structures in which a gap or a space can be provided where the ends of the insulating wing portions 113 and 114 are positioned in order to reduce interference. The evasion portion 121 or opening can have a groove shape, such that interference evasion with the insulating wing portions 113 and 114 is good and the top case 120 may be easily positioned on the top case 120.

As such, the first support rib 122 is provided at a portion where the evasion portion 121 or opening is not formed so as to support on the top of the polymer cell 110. For example, by providing the rib at a portion where the lead tabs 111 and 112 are provided, the assemblability between the polymer cell 110 and the top case 120 is improved and an assembling state is more stably maintained. A plurality of terminal holes 123 are also provided on the top so as to expose the terminal of the PCM to the outside.

The first support rib 122 may comprise a plurality like the illustrated embodiment and may extend downwards at both sides of the evasion portion 121 or opening with the evasion portion 121 or opening interposed therebetween.

Figure 5:
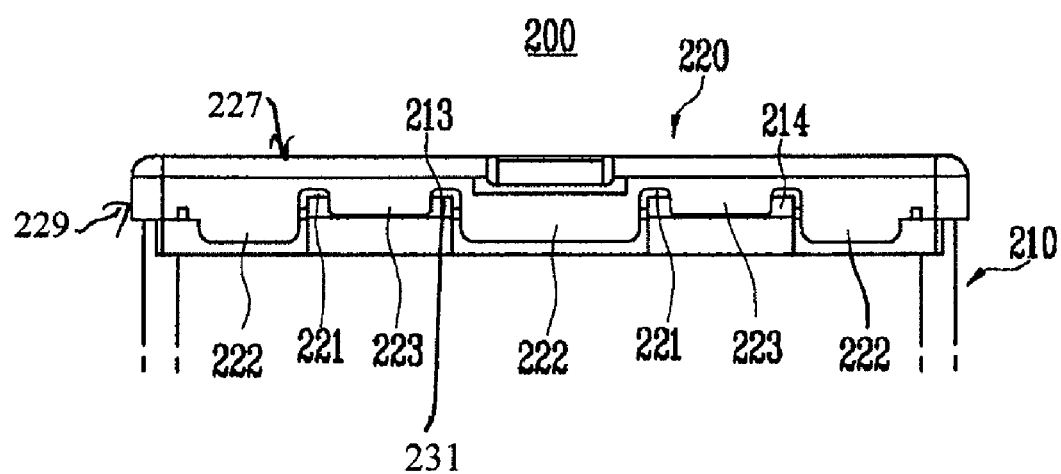
FIG. 5 is a front view showing a secondary battery according to a second embodiment of the present invention.

FIG. 5 is a front view showing a secondary battery according to a second embodiment of the present invention. As shown in FIG. 5, the secondary battery 200 according to the second embodiment of the present invention, includes a polymer cell 210 in which insulating wing portions 213 and 214 are provided and a top case 220 where an evasion portion 221 or opening is provided so as to reduce interference with the insulating wing portions 213 and 214 while being assembled to the polymer cell 210. Since the polymer cell 210 and the top case 220 is substantially similar to that described in detail in the secondary battery 100 according to the first embodiment of the present invention, the differences from the secondary battery 100 according to the first embodiment will primarily be described.

The top case 220 in this embodiment may further include a second support rib 223 in the evasion portion 221 or opening and the second support rib 223 serves to not expose the lead tabs 111 and 112.

The second support rib 223 may have a width smaller than a width of the evasion portion 221 or opening so as to inhibit the ends of the insulating wing portions 213 and 214 from interference during assembly with the top case 120 and so as to define gaps in the evasion portion 221 or opening on the sides of the second support rib 223. In addition, the second support rib 223 can be changed depending on exterior shapes or sizes of the insulating wing portions 213 and 214 and the lead tabs. Further, the second support rib 223 may extend downward to be supported on the top of the polymer cell 210 like the first support rib 222 or like the illustrated embodiment, the second support rib 223 may extend down only to a position where a lead tab (not shown) in the evasion portion 221 or opening is covered.

An operation of the secondary battery according to the present invention having the above-mentioned configuration will be described below.

By the secondary battery 100 according to the first embodiment shown in FIGS. 3 and 4, in case of the lead tabs 111 and 112 are provided in the polymer cell 110, the insulating wing portions 113 and 114 comprising the insulating tape, insulating material, or the like that covers the lead tabs 111 and 112 are deteriorated by the heat while sealing. As a result, the exterior shape of the insulating wing portions 113 and 114 are irregular, such that the size and stability may be deteriorated. Therefore, when the top case 120 is covered and assembled in the insulating wing portions 113 and 114, the interference between the top case 120 and the insulating portions 113 and 114 can be reduced by the evasion portion 121 or opening. As such, since the evasion portion 121 or opening is formed so as to expose the ends of the insulating wing portions 113 and 114, the insulating wing portions 113 and 114 do not influence the exterior size of the secondary battery 100 as much and as a result, it is possible to achieve a more stable manufacturing process and increase the reliability and competency of an inner pack to which the polymer cell 110 is applied.

The top case 120 can easily be assembled with the polymer cell 110 by the first support rib 122 supporting the top of the polymer cell 110 and can stably maintain the assembled state.

In addition, like the secondary battery 200 according to the second embodiment shown in FIG. 5, the second support rib 223 formed in the evasion portion 221 or opening is further provided so as not to expose the lead tabs to the outside. Further, the second support rib 223 may extend downwards to be supported on the top of the polymer cell 210.

As described above, although a detailed embodiment has been described in detail, various modifications can be made without departing from the spirit of the present invention. Accordingly, the scope of the present invention should not be limited based on the described embodiments and should be determined in light of the appended claims to be described below and equivalents thereto.

What is claimed is:

1. A secondary battery comprising:
an electrode assembly having a first and second electrode;
a sealable case that receives the electrode assembly, wherein the case is sealed and wherein the first and second electrodes extend outward from the sealed case and wherein a portion of the first and second electrodes that extend out of the sealed case are insulated;
a top case having a first surface and sidewalls that define a plurality of first ribs that extends outward from the first surface wherein the top case is positioned over the sealable case adjacent where the first and second electrodes extend outward of the sealable case wherein the top case defines openings within the sidewalls that are positioned so that when the top case is positioned on the sealable case the openings are positioned proximate the insulated portions of the first and second electrodes so that the top case is spaced from the insulated portions of the first and second electrodes when the top case is mounted on the sealable case and wherein at least one second rib is positioned within the openings so as to extend outward from the first surface of the top case and to define a gap between the at least one second rib and the sidewall of the sealable case and wherein the at least one second rib extends outward from the first surface of the top case a distance less than the distance of one of the plurality so as to have a smaller length than the one of plurality of first ribs.

2. The secondary battery of claim 1, wherein the insulated portion of the first and second electrode is covered by insulating tape.

3. The secondary battery of claim 1, wherein the insulated portion of the first and second electrodes define wing portions and wherein the openings are sized so as to space the top case from the wing portions of the first and second electrodes.

4. The secondary battery of claim 1, wherein the top case defines the first surface with first and second sidewalls extending outwardly therefrom, wherein the top case is positioned proximate the sealable case so that the first and second electrodes extend parallel to the first and second sidewalls.

5. The secondary battery of claim 4, wherein the openings are formed in the first or the second side walls.

6. The secondary battery of claim 5, wherein the first side wall defines at least a first and a second opening positioned proximate the first and second electrodes.

7. The secondary battery of claim 6, wherein at least one first rib extends between the first and the second opening.

8. The secondary battery of claim 7, wherein the top case has a first and a second end and wherein the top case has at least one first rib positioned between the first or second opening and the first or second end.

9. The secondary battery of claim 1, wherein the at least one second rib has a length that is less than the length of the opening so as to define a gap between the at least one second rib and the sealable case.

10. The secondary battery of claim 9, wherein the at least one second rib is narrower than the width of a first opening so as to define at least one sub-opening within the first opening that exposes the insulation about the first or second electrode.

11. The secondary battery of claim 1, wherein the at least one second rib has a width that is less than a width of the at least one first rib.

12. The secondary battery of claim 1, wherein the secondary battery comprises a pouch battery.

* * * * *